US012712219B2

(12) United States Patent
Cao et al.

(10) Patent No.: US 12,712,219 B2
(45) Date of Patent: Aug. 18, 2026

(54) BATTERY PACK LIQUID-COOLED PLATE AND BATTERY PACK

(71) Applicants: REPT BATTERO Energy Co., Ltd., Wenzhou (CN); Shanghai Ruipu Energy Co., Ltd., Shanghai (CN)

(72) Inventors: Hui Cao, Wenzhou (CN); Qi Zhao, Shanghai (CN); Si Liu, Shanghai (CN); Wenlong Li, Shanghai (CN); Yantao Shao, Shanghai (CN); Chen Yu, Shanghai (CN); Min Hou, Shanghai (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 583 days.

(21) Appl. No.: 18/204,191

(22) Filed: May 31, 2023

(65) Prior Publication Data

US 2023/0387504 A1 Nov. 30, 2023

(30) Foreign Application Priority Data

May 31, 2022 (CN) ......................... 202210613582.5
Jun. 10, 2022 (CN) ......................... 202210657899.9
Aug. 26, 2022 (CN) ......................... 202222262741.X

(51) Int. Cl.
*H01M 10/6556* (2014.01)
*H01M 10/613* (2014.01)
*H01M 10/6568* (2014.01)

(52) U.S. Cl.
CPC ..... *H01M 10/6556* (2015.04); *H01M 10/613* (2015.04); *H01M 10/6568* (2015.04)

(58) Field of Classification Search
CPC ........... H01M 10/6556; H01M 10/613; H01M 10/6568
See application file for complete search history.

(56) References Cited

U.S. PATENT DOCUMENTS

2019/0312322 A1 10/2019 Ahn et al.
2020/0398652 A1 12/2020 Stephens et al.
2022/0278393 A1 9/2022 Becker et al.

FOREIGN PATENT DOCUMENTS

CN 106611827 A 5/2017
CN 206834267 U 1/2018
(Continued)

OTHER PUBLICATIONS

PCT International Search Report and Written Opinion, PCT/CN2023/097274, Sep. 20, 2023, 15 pages.
(Continued)

*Primary Examiner* — Sarah A. Slifka
(74) *Attorney, Agent, or Firm* — Quarles & Brady LLP

(57) ABSTRACT

The present application relates to the technical field of battery equipment and electric vehicles, disclosing a battery pack liquid-cooled plate and a battery pack. A battery pack liquid-cooled plate comprises: a liquid-cooled bottom plate for bottom cooling of a battery, wherein a first cooling channel is provided in the liquid-cooled bottom plate; multiple liquid-cooled side plates used for side cooling of the battery, wherein a second cooling channel is provided in each liquid-cooled side plate, each liquid-cooled side plate and the liquid-cooled bottom plate are arranged perpendicular to each other, and a flow channel of each liquid-cooled side plate interconnects with each other through a multi-pass device to form a flow-channel structure.

16 Claims, 9 Drawing Sheets

(56) References Cited

FOREIGN PATENT DOCUMENTS

| | | | |
|---|---|---|---|
| CN | 209843897 | U | 12/2019 |
| CN | 210200838 | U | 3/2020 |
| CN | 212109182 | U | 12/2020 |
| CN | 212392342 | U | 1/2021 |
| CN | 213304226 | U | 5/2021 |
| CN | 213660492 | U | 7/2021 |
| CN | 113629315 | A | 11/2021 |
| CN | 114175361 | A | 3/2022 |
| CN | 115020860 | A | 9/2022 |
| CN | 217903221 | U | 11/2022 |
| CN | 218498164 | U | 2/2023 |

OTHER PUBLICATIONS

The State Intellectual Property Office of the People's Republic of China, First Office Action, Application No. 202210657899.9, May 1, 2025, 14 pages.

European Patent Office, Extended European Search Report, Application No. 23275086.9, Sep. 26, 2023, 7 pages.

BATTERY PACK LIQUID-COOLED PLATE AND BATTERY PACK

CROSS-REFERENCE TO RELATED APPLICATIONS

This application claims priority to Chinese Patent Application No. 202210613582.5 filed May 31, 2022, Chinese Patent Application No. 202210657899.9 filed Jun. 10, 2022, and Chinese Patent Application No. 202222262741.X filed Aug. 26, 2022, the disclosures of which are incorporated herein by reference in their entirety and for all purposes.

TECHNICAL FIELD

The present application mainly relates to the technical fields of battery equipment and electric vehicles, and in particular to a battery pack liquid-cooled plate and a battery pack.

BACKGROUND

At present, with vigorous promotion of the new energy industry, the development of new energy vehicles has ushered in unprecedented opportunities. However, the development of new energy vehicles is inseparable from the development of battery pack technology. Improving the safety performance of battery packs is an indicator of battery pack technology and has attracted increasingly more attention.

Proper operating temperature is an important factor in improving the performance and safety of battery packs. When the battery temperature is too high, it will reduce the performance of the battery and will cause danger of battery explosion. At the same time, the working life of the battery will be significantly shortened in a high temperature environment for a long time, therefore, it is particularly important to apply a reasonable cooling system. The mainstream cooling system on the market is generally located at the bottom of the battery module. This cooling method can meet most usage conditions, however, for high-capacity batteries, the heat generated by 1 C charging and discharging is large; under the limitation of the model and specification of the liquid pump, the flow rate of the liquid inlet is constant, and the liquid cooling at the bottom alone cannot quickly remove the heat.

SUMMARY

The technical problem to be solved by the present invention is to provide a battery pack liquid-cooled plate and a battery pack, the side heat dissipation of the battery pack is increased, the heat dissipation effect of the battery pack is improved, and the stability and convenience of assembling the liquid-cooled side plate are improved.

In order to solve the above technical problems, the present application provides a battery pack liquid-cooled plate and a battery pack, the battery pack liquid-cooled plate comprises: a liquid-cooled bottom plate (1) for bottom cooling of a battery, wherein a first cooling channel is provided in the liquid-cooled bottom plate (1); multiple liquid-cooled side plates (2) used for side cooling of the battery, wherein a second cooling channel is provided in each liquid-cooled side plate (2), each liquid-cooled side plate (2) and the liquid-cooled bottom plate (1) are arranged perpendicular to each other, and a flow channel of each liquid-cooled side plate (2) interconnects with each other through a multi-pass device (3) to form a flow-channel structure.

In one embodiment of the present invention, the liquid-cooled bottom plate (1) has a liquid outlet (14) and a liquid inlet (13), and the liquid outlet (14) and the liquid inlet (13) are both equipped with a liquid distribution box (4), and the liquid distribution box (4) has a bottom plate interface (43) and a side plate interface (44), and, the flow channel in each liquid-cooled bottom plate (1) interconnects with the bottom plate interface (43) of two liquid distribution boxes (4) to form the first cooling channel; the flow channel structure interconnects with the side plate interface (44) of the two liquid distribution boxes (4) to form the second cooling channel.

In one embodiment of the present invention, the multi-pass device comprises: a liquid-inlet pipe (31), interconnecting with the liquid distribution box (4) located at the liquid inlet (13); a liquid-outlet pipe (32), interconnecting with the liquid distribution box (4) located at the liquid outlet (14); and a diversion device (33) for supplying liquid to the liquid-cooled side plate (2), number of the diversion devices (33) is one or more, and two ends of the diversion device (33) are connected to the liquid-inlet pipe (31) and said outlet pipe (32), wherein, when there are multiple diversion devices (33), the diversion devices (33) are arranged in parallel between the liquid-outlet pipe (32) and the liquid-inlet pipe (31), and each diversion device (33) connects the liquid-cooled side plates (2) in same column or row in series, so that to distribute a cooling liquid to the liquid-cooled side plates (2) in same column or row.

In one embodiment of the present invention, each liquid-cooled side plate comprises: a uniform-temperature plate (21) for averaging temperature, number of the uniform-temperature plate (21) is one or two, and the uniform-temperature plate (21) is installed on the liquid-cooled bottom plate (1); a liquid-cooled pipe (22) arranged on a side of the uniform-temperature plate (21) away from the battery.

In one embodiment of the present invention, each diversion device (33) comprises a connecting pipeline group (331), number of the connecting pipeline group (331) is one or two groups, each connecting pipeline group (331) connects multiple liquid-cooled side plates (2) connected to the same side of the diversion device (33) in series, wherein, when number of connecting pipeline group (331) is two, each diversion device (33) further comprises: an inlet liquid diverter (332), one end of the inlet liquid diverter (332) connects to the liquid-inlet pipe (31), and the other end respectively connects to the inlets of two groups of the connecting pipeline group (331); an outlet liquid diverter (333), one end of the outlet liquid diverter (333) connects to the liquid-outlet pipe (32), and the other end is respectively connects to the outlets of two groups of connecting pipeline group (331).

In one embodiment of the present invention, the battery pack liquid-cooled plate comprises: a supporting center beam (15) installed between each diversion device (33) and the liquid-cooled bottom plate (1).

In one embodiment of the present invention, the liquid-cooled bottom plate (1) comprises: a frame (11), and the liquid inlet (13) and the liquid outlet (14) are provided on the frame (11); a liquid-cooled plate (12), the first cooling channel is arranged in the liquid-cooled plate (12), and the two ends of the first cooling channel are respectively connected to the bottom plate interface (43) of the two liquid distribution boxes (4).

In one embodiment of the present invention, the frame (11) comprises: a structural side beam (111) for carrying weight close to ends of the liquid-cooled side plates (2); an installation side beam (112) used for the installation of the battery pack liquid-cooled plate, and the installation side beam (112) is arranged perpendicular to the length direction of the structural side beam (111).

In one embodiment of the present invention, the structural side beam comprises: a beam body (1111); a reinforced beam (1112), installed on a side of the beam body (1111) and the side is close to the battery.

In one embodiment of the present invention, the liquid outlet (14) and the liquid inlet (13) on the liquid-cooled bottom plate (1) respectively is provided a flow channel hole (430) respectively; the bottom plate interface (43) is connected to the flow channel hole (430), and the diameter of the bottom plate interface (43) is larger than the flow channel hole (430).

In one embodiment of the present invention, an installation space (522) for installing at least one battery is formed between two adjacent liquid-cooled side plates (2), the installation space (522) is suitable for containing a battery module (53) composed of a plurality of batteries, the battery pack liquid-cooled plate further comprising a fixing mechanism (54), the fixing mechanism (4) is arranged on the liquid-cooled side plate (52), and is used to fix the liquid-cooled side plate (52) on the battery module (53).

In one embodiment of the present invention, the liquid-cooled side plate (52) is provided with a first hole (521), the fixing mechanism (54) is penetrated through the first hole (521), and one end of the fixing mechanism (54) has a clamping part for clamping, the clamping part is located in a second hole (5311) on the end plate (531) of the battery module (53).

In one embodiment of the present invention, the fixing mechanism (54) comprises a cap (541) and at least an elastic-handle group (542), wherein, one end of the elastic-handle group (542) connects to the cap (541), and the other end extends away from each other to form a V-shaped structure; the end of the elastic-handle group (542) away from the cap (541) is further provided with a hook part, and the elastic-handle group (542) and the hook part on the elastic-handle group (542) form a clamping part together.

In one embodiment of the present invention, the liquid-cooled side plate (52) is provided with at least one pair of first holes (521), and the two first holes (521) in the pair of first holes (521) are distributed at intervals along the length direction of the liquid-cooled side plate (52), and one of the first holes (521) is a round hole, and the other first hole (521) is a waist-shaped hole extending along the length direction of the liquid-cooled side plate (52).

Another aspect of the present invention also provides a battery pack, the battery pack comprises a battery pack liquid-cooled plate according to any one of the above embodiments.

Compared with the prior art, the present application has the following advantages: according to the battery pack liquid-cooled plate and a battery pack of the present application, due to the addition of liquid-cooled side plates, the side of the battery can also be cooled, increasing the heat exchange efficiency for battery heat generation, ensuring that the battery pack is charged and discharged in a relatively comfortable range of use under various harsh operating conditions, thereby improving the efficiency of the battery and increasing the cycle life of the battery. At the same time, the present application uses the liquid distribution box to send the liquid flow to the liquid-cooled bottom plate and the liquid-cooled side plate at the same time, the structure is simple, no major changes are required to the application scene, and the application cost is low. In addition, the liquid-cooled side plate can be quickly and stably fixed on the battery module by means of a fixing mechanism.

BRIEF DESCRIPTION OF THE DRAWINGS

The drawings are included to provide a further understanding of the present application, and they are included and constitute a part of the present application, the drawings show the embodiments of the present application, and serving to explain the principles of the present application together with the description. In the drawings.

SIGNS IN THE DRAWINGS

- FIG. 1 to FIG. 5: 1. liquid-cooled bottom plate; 11. frame; 111. structural side beam; 1111. beam body; 1112. reinforced beam; 112. installation side beam; 12. liquid-cooled plate; 13. liquid inlet; 14. liquid outlet; 15. supporting center beam; 2. liquid-cooled side plate; 21. uniform-temperature plate; 22. liquid-cooled pipe; 3. multi-pass device; 31. liquid-inlet pipe; 32. liquid-outlet pipe; 33. diversion device; 331. connecting pipeline group; 332. inlet liquid diverter; 333. outlet liquid diverter; 4. liquid distribution box; 41. box body; 42. external interface; 43. bottom plate interface; 430. flow channel hole; 44. side plate interface; 45. connecting mouth;
- FIG. 6 to FIG. 12: 51. liquid-cooled bottom plate; 52. liquid-cooled side plate; 521. first hole; 522. installation space; 523. uniform-temperature plate; 524. liquid-cooled pipe; 53. battery module; 531. end plate; 5311. second hole; 54. fixing mechanism; 541. cap; 5411. first flange; 5412. second flange; 542. elastic-handle group; 5421. elastic handle; 50. pipeline; 501. the first pipeline; 502. liquid-inlet pipe; 503. liquid-outlet pipe; 6. liquid inlet; 7. liquid outlet; 8. first tee; 9. second tee.

PREFERRED EMBODIMENT OF THE PRESENT INVENTION

In order to make the purposes, technical solutions and advantages of the embodiments of the present application clearer, the technical solutions in the embodiments of the present application will be clearly and completely described below in conjunction with the drawings in the embodiments of the present application. Obviously, the described embodiments are parts of the embodiments of this application, but not all of them. Based on the embodiments in the present application, all other embodiments obtained by persons of ordinary skill in the art without making creative efforts belong to the protection scope of the present application.

Figure 1:
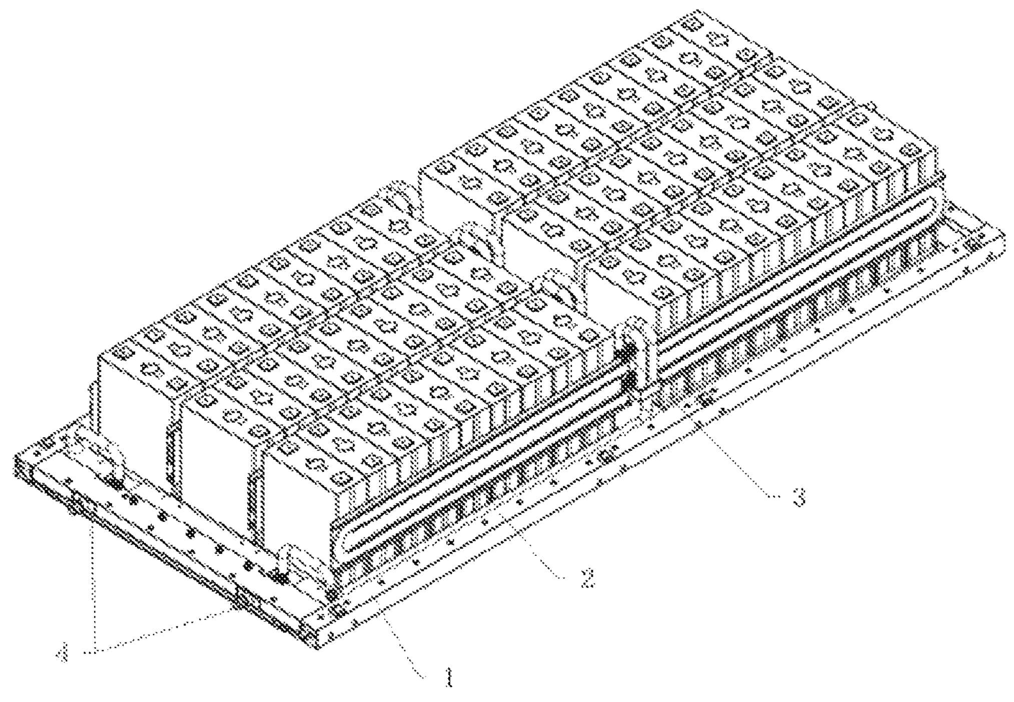
FIG. 1 is a schematic structural diagram of a battery pack liquid-cooled plate in an embodiment of the present application.

In this application, an embodiment of a battery pack liquid-cooled plate is provided, including a liquid-cooled bottom plate 1, a liquid-cooled side plate 2 and a liquid distribution box 4. In this application, for the convenience of description, as shown in FIG. 1, a plurality of adjacent batteries refers to a set of batteries.

Figure 3:
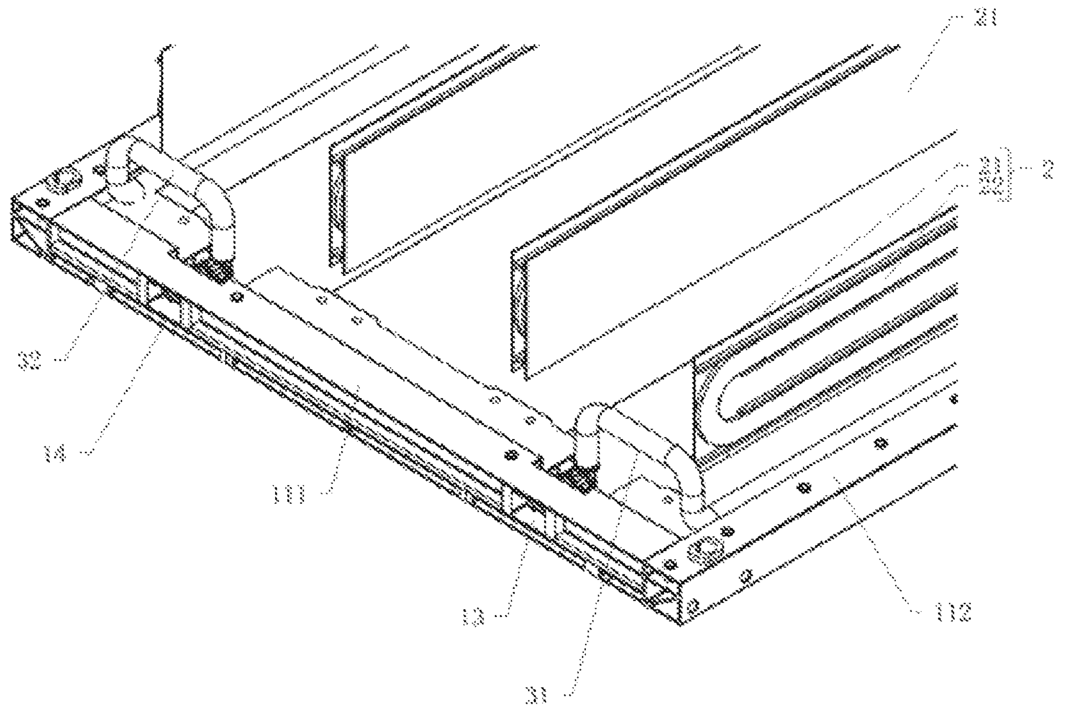
FIG. 3 is the cross-sectional schematic view of structural edge beam in the embodiment shown in FIG. 2.

As shown in FIG. 3, the liquid-cooled bottom plate 1 is generally formed by profile stamping, and there are multiple cavities inside to form channels for cooling liquid circulation. In this application, the liquid-cooled bottom plate 1 is made of aluminum alloy, and there are nearly square cavities inside; there is a hole connected between the cavities, so that it forms an integral flow channel that bends back and forth. The side of liquid-cooled bottom plate 1 is provided with liquid outlet 14 and liquid inlet 13, liquid outlet 14 and liquid inlet 13 are both equipped with liquid distribution box 4. The liquid distribution box 4 has bottom plate interface 43 and side plate interface 44, and the bottom plate interface 43 of the liquid distribution box 4 located at the liquid inlet 13 interconnects with one of the cavities, generally the cavity closest to the edge. The bottom plate interface 43 of the liquid distribution box 4 located at the liquid outlet 14 interconnects with another cavity. In this way, a circuit is formed for the cooling liquid to enter from the liquid inlet 13, flow through the cooling bottom plate and then flow out from the liquid outlet 14, which is the first cooling channel.

There are multiple liquid-cooled side plates 2, generally, there are a pair of liquid-cooled side plates 2 on both sides of each row or column of batteries, and the directions are the same to facilitate the arrangement of liquid channels. In general embodiments, the liquid-cooled side plates 2 are firmly close to the battery or a set of batteries, which can effectively improve the cooling efficiency of the liquid-cooled side plate 2. The liquid-cooled side plates 2 interconnects with each other through the multi-pass device 3 and form a flow channel structure, and the second cooling channel for cooling the side of the battery pack is formed between the flow channel structure and the two liquid distribution boxes 4.

There are many kinds of structures of the multi-pass device 3, for example, a star arrangement is adopted, that is, the outlet of the liquid-inlet pipe 31 is radially scattered and connected to each liquid-cooled side plate 2, and then imported on the inlet connected to the liquid-outlet pipe 32. However, this method has a complex liquid way structure and is difficult to maintain.

Therefore, in some preferred embodiments, the multi-pass device 3 comprises a liquid-inlet pipe 31, a liquid-outlet pipe 32 and a diversion device 33.

The liquid-inlet pipe 31 and the liquid-outlet pipe 32 are the main pipes for liquid inlet and outlet respectively. These two pipes are generally attached to the edge of the liquid-cooled bottom plate 1 and are protected by the side wall of the liquid-cooled bottom plate 1.

The diversion device 33 is arranged between the liquid-outlet pipe 32 and the liquid-inlet pipe 31, and the number of the diversion device is one or more. When there are multiple diversion devices 33, the diversion devices are arranged in parallel with each other. In some embodiments, some valves are provided at the diversion device 33 near the liquid inlet 13 to limit the liquid intake of the diversion device 33 near the liquid inlet 13, so as to prevent the rear diversion device 33 from not getting enough cooling liquid. The diversion device 33 mainly flows the liquid into the liquid-cooled side plates 2 in the same column or row. Generally speaking, the arrangement of the diversion device 33 is mainly designed according to the batteries to be arranged. After the batteries are arranged on the liquid-cooled bottom plate 1, the liquid-cooled side plates 2 are arranged according to the sides that needs to be cooled by the batteries, then, the diversion device 33 is arranged according to the ends of the liquid-cooled side plate 2. At the same time, in a general embodiment, each diversion device 33 is connected with two rows of liquid-cooled side plate 2, so as to reduce the number of components used for control. In some embodiments, in order to improve the cooling control accuracy, each diversion device 33 is connected in series with one row of liquid-cooled side plate 2.

There are many kinds of internal structures of the liquid-cooled side plate 2, for example, the internal pass of the liquid-cooled side plate 2 is made into a strake structure or a capillary structure, which can effectively improve the heat exchange efficiency, but the flow resistance is relatively large.

Therefore, in some preferred embodiments, the above-mentioned liquid-cooled side plate 2 comprises a uniform-temperature plate 21 and a liquid-cooled pipe 22; the uniform-temperature plate 21 is closely attached to the side of the battery. On the one hand, it is to protect the liquid-cooled pipe 22 from being directly compressed by the battery, and on the other hand, the material strength and thermal conductivity of the uniform-temperature plate 21 are relatively strong, such as some metals. In some embodiments, a thermally conductive material with stronger thermal conductivity is used to connect the battery and the uniform-temperature plate 21, which can achieve the effect of temperature uniformity. Specifically, the number of uniform-temperature plate 21 is one or two, depending on whether there is one set or two sets of batteries in contact with the liquid-cooled side plate 2. As can be seen in FIG. 1, the outermost liquid-cooled side plate 2 is only in contact with one group of batteries, correspondingly, only one set of uniform-temperature plates 21 is needed, and the other side can be vacated to increase the heat dissipation efficiency of the battery and the liquid-cooled pipe 22. The liquid-cooled pipe 22 is a flat-mouthed pipe with a rectangular cross section, which can be attached to the surface of the uniform-temperature plate 21 to increase heat transfer efficiency. When there are two uniform-temperature plates 21, there are two liquid-cooled pipes 22 between the two uniform-temperature plates 21, and the two liquid-cooled pipes 22 are not in direct contact, so as to avoid a large amount of heat exchange between the two pipes, reducing the heat transfer efficiency.

In a further embodiment, the above-mentioned diversion device 33 comprises a connecting pipeline group 331, an inlet liquid diverter 332 and an outlet liquid diverter 333.

Figure 4:
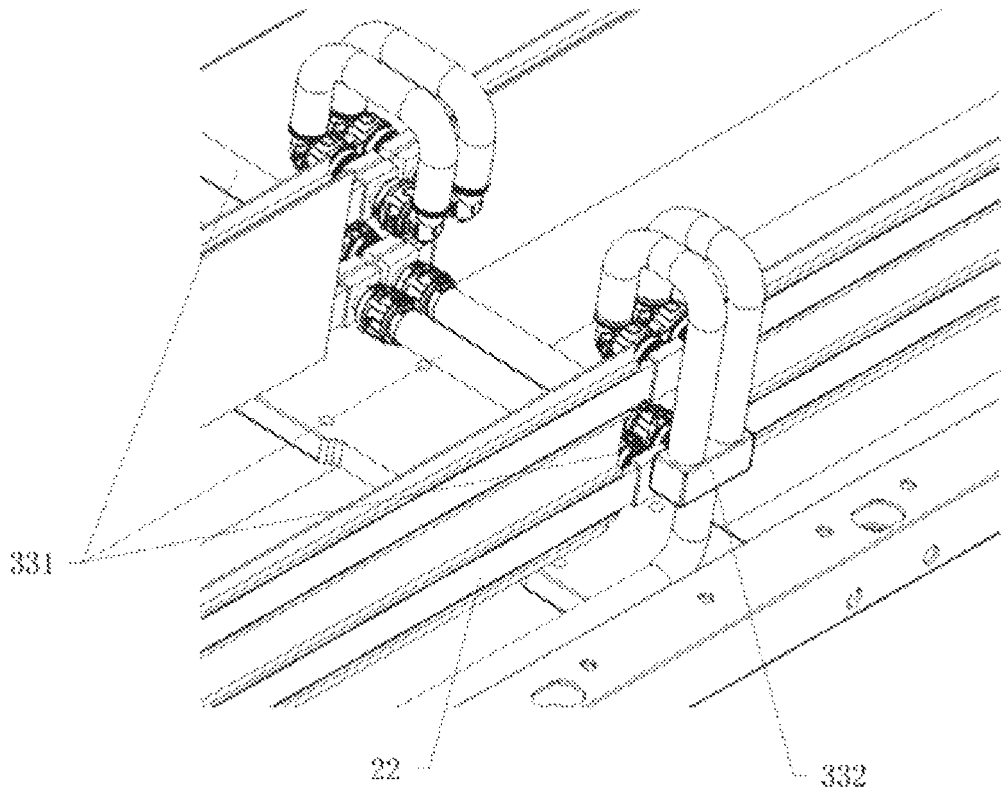
FIG. 4 is the enlarged schematic diagram of the diversion device in the embodiment shown in FIG. 1.

The connecting pipeline group 331 is shown in FIG. 4, the inlet and outlet of each liquid-cooled pipe 22 are provided with a steering mechanism for liquid flow steering, the steering mechanisms at different positions are connected to each other in a certain order, so that a row of liquid-cooled side plates 2 are serially connected in sequence. Specifically, in this embodiment, the cooling liquid starts from the inlet liquid diverter 332 and enters the upper steering mechanism through a U-shaped pipe. It should be noted that, in all the embodiments of the present application, the cooling liquid can be specifically implemented as cooling water. In this case, the above-mentioned liquid-cooled bottom plate 1, liquid-cooled side plate 2, liquid inlet 13, liquid outlet 14, liquid-inlet pipe 31, liquid-outlet pipe 32, inlet liquid diverter 332, outlet liquid diverter 333 and liquid distribution box 4 etc. can all be understood as structural components with cooling water as the cooling medium, so they can also be understood as water-cooled bottom plate, water-cooled side plate, water inlet, water outlet, water-inlet pipe, water-outlet pipe, inlet water diverter, outlet water diverter, water distribution box and so on. Then the steering mechanism guides the cooling liquid to the liquid-cooled pipe 22, and the cooling liquid in the liquid-cooled pipe 22 is sent out from the steering mechanism located below, passes through a straight pipe, and is sent to the steering mechanism of the next liquid-cooled side plate 2, in which the steering mechanism is located at the bottom. And then the cooling liquid is sent out from the upper steering mechanism through the liquid-cooled pipe 22 corresponding to the liquid-cooled side plate 2 and enters the upper steering mechanism through a U-shaped pipeline. After going through multiple groups, the liquid passes through a U-shaped pipeline, and the liquid is collected to the liquid outlet diverter 333, and then sent out from the liquid-outlet pipe 32, which is the second cooling channel.

In this embodiment, the outlet liquid diverter 333 and the inlet liquid diverter 332 are only different in the direction of liquid flow, and the structure is completely the same, so the user can exchange the liquid outlet 14 and the liquid inlet 13 arbitrarily according to requirements. The corresponding outlet liquid diverter 333 and the inlet liquid diverter 332 can also be exchanged, and the liquid enters from the current liquid outlet 14, passes through the outlet liquid diverter 333 and then enters the connecting pipeline group 331, and finally gathers together in the current inlet liquid diverter 332 and then flows out from the liquid inlet 13.

In practice, because the pipelines in the liquid-cooled side plate 2 are relatively stable with less structure and relatively low weight, the liquid-cooled bottom plate 1 can usually support itself. There are usually multiple steering, fixing and sealing structure at the diversion device 33, so that the self-weight is relatively large, and the impact in the vertical direction is relatively large when the liquid flow turns, which often causes damage to the liquid-cooled bottom plate 1 at this position.

In some preferred embodiments, in order to ensure the safety of the liquid-cooled bottom plate 1, and the liquid-cooled bottom plate 1 is also provided with a support center beam 15. The support center beam 15 is located between each diversion device 33 and the liquid-cooled bottom plate 1. Specifically, in order to prolong the service life of the liquid-cooled bottom plate 1, generally, the diversion devices 33 are evenly distributed on the liquid-cooled bottom plate 1. In this embodiment, there is only one diversion devices 33, and the supporting center beam 15 is also arranged in the middle of the liquid-cooled bottom plate 1.

In some preferred embodiments, the liquid-cooled bottom plate 1 comprises a frame 11 and a liquid-cooled plate 12. The frame 11 has a liquid inlet 13 and a liquid outlet 14, and the liquid-cooled plate 12 is installed in the frame 11. There also provides a flow channel inside the liquid-cooled plate 12, and the function of the flow channel is to flow the cooling liquid. The above-mentioned liquid distribution box 4 is installed in the liquid outlet 14 and the liquid inlet 13 and is also embedded in the frame 11 accordingly. The bottom plate interface 43 of the liquid distribution box 4 interconnects with both ends of the flow channel.

Figure 2:
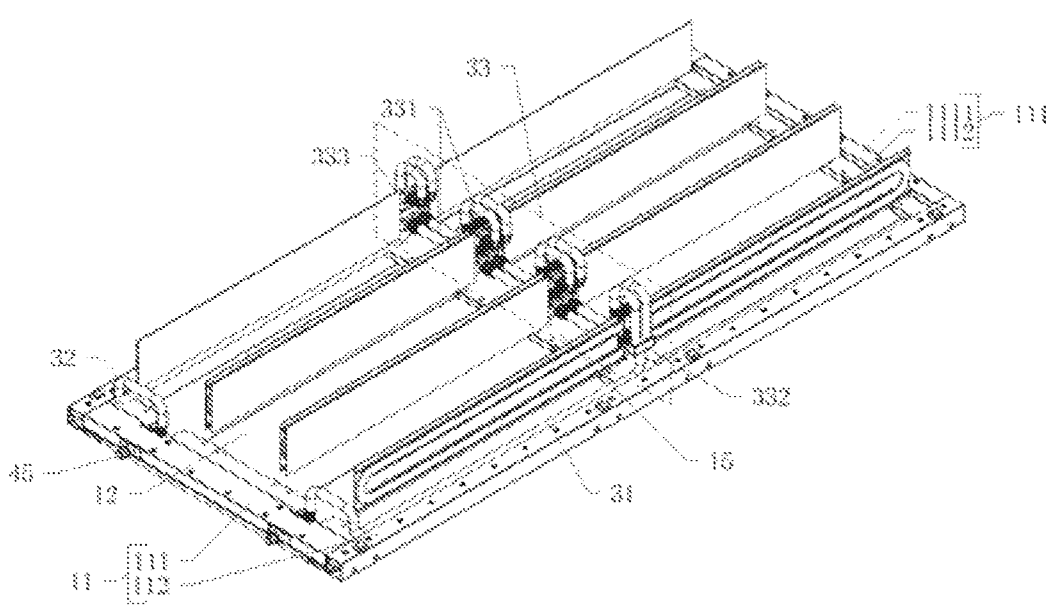
FIG. 2 is the schematic structural diagram after removing battery in the embodiment shown in FIG. 1.

Furthermore, in order to facilitate the installation of the application on vehicles or other locations where batteries need to be installed, in some preferred embodiments, the above-mentioned frame 11 comprises structural side beams 111 for carrying weight, and installation side beams 112 for installing the battery pack liquid-cooled plate. Specifically, the structural side beam 111 is mainly located at the end of a set of batteries, so that when the battery slightly slides, a set of batteries located between two multi-pass devices 3 can be limited by means of the multi-pass device 3, while the battery close to the edge needs the support from the structural side beams 111. As shown in FIG. 2 and FIG. 4, the installation side beam 112 is provided with a plurality of holes on the surface for installing structures such as battery shields and guardrails, and there also provides some larger holes for installing stronger connector used to install the installation side beam 112 to the vehicles.

Furthermore, generally because there are many holes and connecting parts on the installation side beam 112, its own strength is not as good as the structural side beam 111, so the length direction of a set of batteries is generally facing the structural side beam 111, that is, the arrangement direction of a set of batteries is parallel to the installation side beam 112. But in this way, when the vehicle bumps, a bending moment or torque will be applied to the structural side beam 111.

In order to reduce the impact, in some further embodiments, the above-mentioned structural side beam 111 also comprises a beam body 1111 and a reinforced beam 1112. Specifically, in general embodiments, only one beam body 1111 is sufficient as the structural side beam 111, but in this embodiment, a reinforced beam 1112 is added to the beam body 1111, and the structure of the reinforced beam 1112 is similar to a ladder. The reinforced beam 1112 is facing the battery, so that it can effectively resist bending and torsion. It should be noted that, as shown in FIG. 2, in some embodiments, the liquid inlet 13 and the liquid outlet 14 are arranged in the structural side beam 111, and the reinforced beam 1112 is cut into multiple sections to avoid pipelines. Pipelines protrude from the gaps between multi sections of the reinforced beams 1112.

In some embodiment processes, the above-mentioned liquid distribution box 4 is fixedly connected between the bottom plate interface 43 and the first cooling channel and is fixedly connected with the second cooling channel at the side plate structure. The liquid distribution box 4 is fixedly connected with the external liquid pipe, so that when the environment is bumpy or shakes, the resulting shaking, bending or twisting needs to be carried by the structure of the liquid distribution box 4 itself; if things go on like this, the structure of the liquid distribution box 4 will be deformed and the service life of the liquid distribution box 4 will be reduced.

Figure 5:
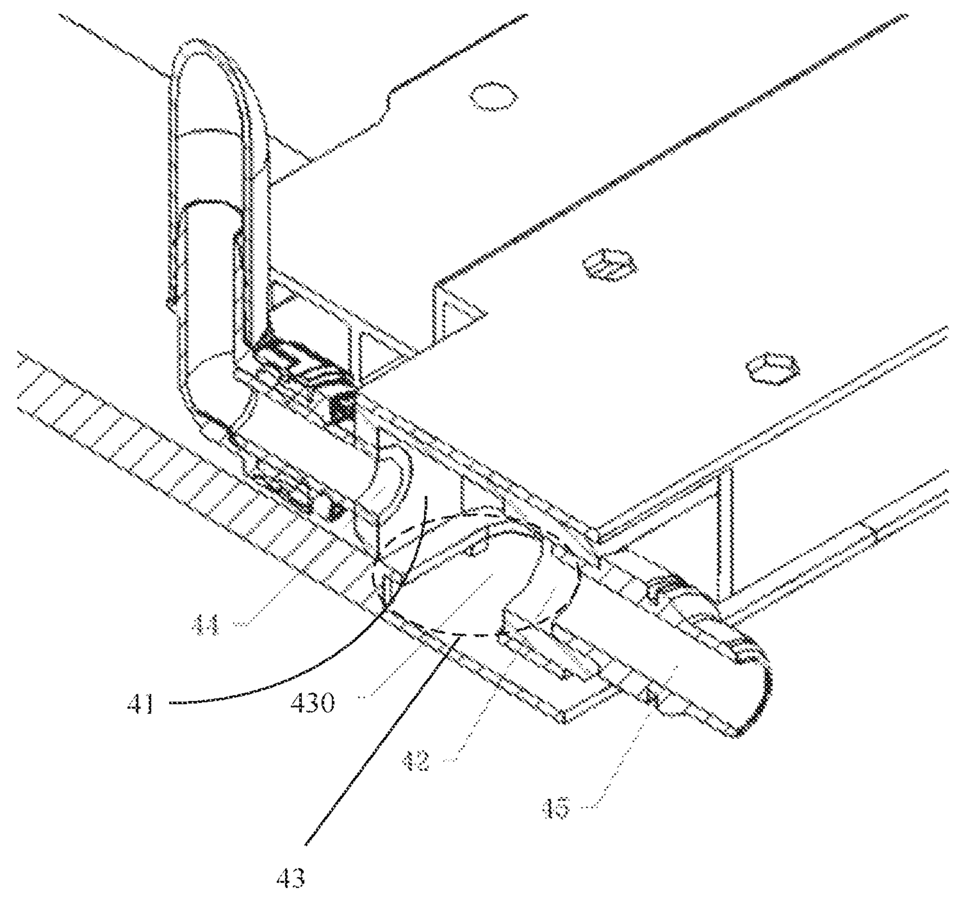
FIG. 5 is a cross-sectional view at the liquid inlet or liquid outlet of the liquid-cooled plate in the embodiment shown in FIG. 1.

Therefore, in some embodiments, the liquid outlet 14 and the liquid inlet 13 of the liquid-cooled bottom plate 1 are respectively provided with flow channel holes 430 interconnecting with the first cooling channel, and the size of the bottom plate interface 43 at the bottom of the liquid distribution box 4 (due to the shielding of other components in FIG. 5, the dotted circle is used to frame the position of the bottom plate interface 43 in FIG. 5) is larger than that of the flow channel hole 430 (the approximate semi-elliptical position in the dotted circle in FIG. 5). In this way, the liquid distribution box 4 does not need to be fixed and has a certain space for movement, and small amount of left and right swings will not have any impact on the cooling liquid cycle. At the same time, the entire shaking is jointly borne by the pipeline and the cooling liquid distribution box 4, which reduces the need for individual components to bear deformation and prolongs the service life. Specifically, as shown in FIG. 5, the bottom of the entire liquid distribution box 4 is hollowed to form a bottom plate interface 43, and the size of the flow channel hole 430 interconnecting with the first cooling channel is smaller than that of the bottom plate interface 43; and there is a small amount of movable space in the front, rear, left, and right directions to eliminate vibration.

Further, the liquid outlet 14 and the liquid inlet 13 are provided with connecting mouth 45 for enhancing the connection force. Specifically, in this embodiment, an external interface 42 is provided on the box body 41 of the liquid distribution box 4 to install the connecting mouth 45. The shape of the connecting mouth 45 is a two-stage variable diameter shape, among which the first stage with a smaller diameter is plugged into the external interface 42, and the connecting mouth 45 is used to prevent the external liquid pipe from slipping. Especially in this type of embodiment, because the liquid distribution box 4 may shake slightly, it is not good for the connection with external cooling liquid pipes.

The present application also provides an embodiment of a battery pack, which includes any one of the battery pack liquid-cooled plates described above.

In this embodiment, the position where the battery of the battery pack is installed is closely attached to the liquid-cooled side plate 2, and the side of the battery is cooled with the help of the liquid-cooled side plate 2, thereby improving the cooling efficiency.

Referring to FIG. 1~FIG. 5 above, the structure features of one embodiment of the present application of a battery pack liquid-cooled plate and a battery pack using the battery pack liquid-cooled plate has been introduced. An embodiment of the battery pack liquid-cooled plate and the battery pack in another more preferred embodiment of the present application will be introduced below with reference to FIG. 6~FIG. 12. In the embodiments described below, the battery pack liquid-cooled plate further includes a fixing mechanism, so that the liquid-cooled side plate can be fixed more conveniently and stably on the corresponding battery module. In some paragraphs, in order to better understand the solution in this embodiment, the names of some components may be slightly different from those in the previous embodiments, and one should combine the relative position of the drawings, the functions of the components and the technical effect of the solution to understand the above-mentioned embodiments in FIG. 1~FIG. 5 and the embodiments in FIG. 6~FIG. 12 below.

The embodiment of the present application provides a conveniently fixed battery pack liquid-cooled plate and battery pack, when the liquid cold plate is placed at the bottom of the battery module, the heat generated by the battery will increase significantly when the battery is charged and discharged at a higher rate, and it is difficult to effectively reduce the temperature of the battery. The problem in the related art can be solved by this embodiment Referring to FIG. 6, the embodiment of the present application provides a conveniently fixed battery pack liquid-cooled plate, which includes a liquid-cooled bottom plate 51, a side cooling unit (which can be understood as the liquid-cooled side plate 2 in the previous embodiment) and a fixing mechanism 54.

Figure 9:
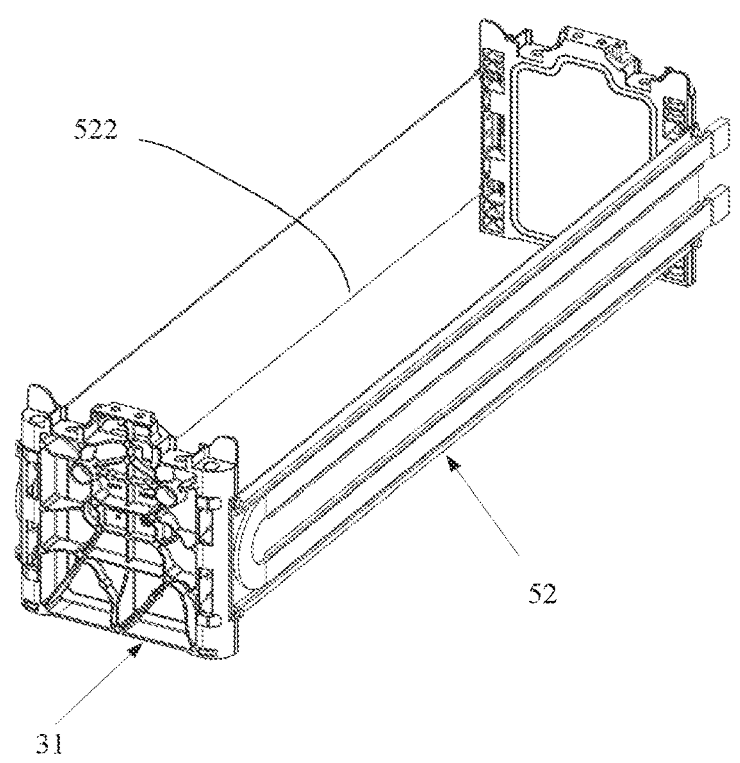
FIG. 9 is a schematic structural diagram of the connection structure between the end plate of the battery module and the liquid-cooled side plate in the embodiment shown in FIG. 8.

A first cooling channel is formed in the liquid-cooled bottom plate 1; the above-mentioned side cooling unit includes a plurality of liquid-cooled side plates 52, and the plurality of liquid-cooled side plates 52 are located on the liquid-cooled bottom plate 51 and arranged at intervals. There forms installation space 522 (FIG. 9 shows the installation space 522 more clearly) for installing the battery module 53 (the battery module 53 includes a plurality of batteries in the previous embodiments) between two adjacent liquid-cooled side plates 52, the pipeline 50 is connected in series with the flow channel in each liquid-cooled side plate 52 in the side cooling unit, so that each flow channel is connected to form a second cooling channel; the fixing mechanism 54 is arranged on the liquid-cooled side plate 52 for fixing the liquid-cooled side plate 52 on the battery module 53.

A side cooling unit is arranged on the liquid-cooled bottom plate 51, and the cooling liquid is divided into two paths to cool the bottom surface and the side surface of the battery pack, that is, a first cooling channel is formed in the liquid-cooled bottom plate 51 to cool the bottom surface of the battery pack; through the pipeline 50, the flow channels in each liquid-cooled side plate 52 are connected in series to form a second cooling channel to cool the side of the battery pack, which increases the cooling area of the entire battery pack and improves the cooling efficiency of the battery pack. In addition, a fixing mechanism 54 is adopted which can quickly and stably fix the liquid-cooled side plate 52 on the battery module 53.

The side cooling unit includes multi liquid-cooled side plates 52, wherein multi refers to two or more, and the number of liquid-cooled side plates 52 can be set according to the number of battery modules 53 contained in the battery pack. For example, if the number of battery modules 53 accommodated in the battery pack is four, then the number of liquid-cooled side plates 52 may be five, which are respectively located on both sides of the battery module 53.

One embodiment of the fixing mechanism 54 for realizing fixing effect is as follows.

Referring to FIG. 7~FIG. 10, the liquid-cooled side plate 52 is provided with a first hole 521, the fixing mechanism 54 penetrates through the first hole 521, and one end of the fixing mechanism 54 has a clamping part for clamping into the second hole 5311 on the end plate 531 of the battery module 53.

The fixing mechanism 54 includes a cap 541 and at least one elastic-handle group 542. One end of the elastic-handle group 542 is connected to the cap 541, and the other ends extend in a direction away from each other to form a V-shaped structure; a hook part is further provided on the end of the elastic-handle group 542 away from the cap 541, and the elastic-handle group 542 and the hook part together form a clamping part.

Figure 10:
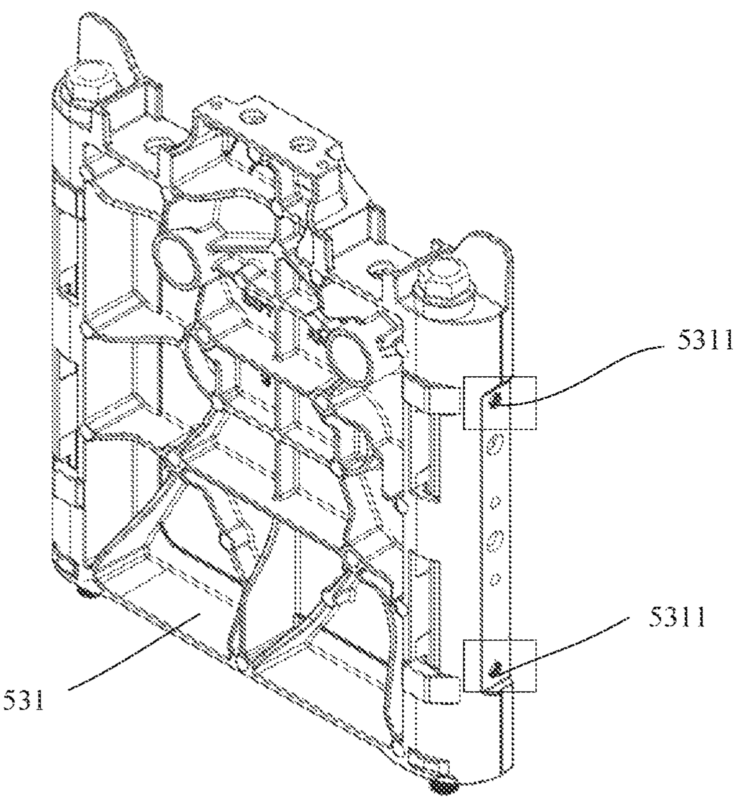
FIG. 10 is a schematic structural diagram of the end plate on a battery pack provided in the embodiment shown in FIG. 8.
Figure 11:
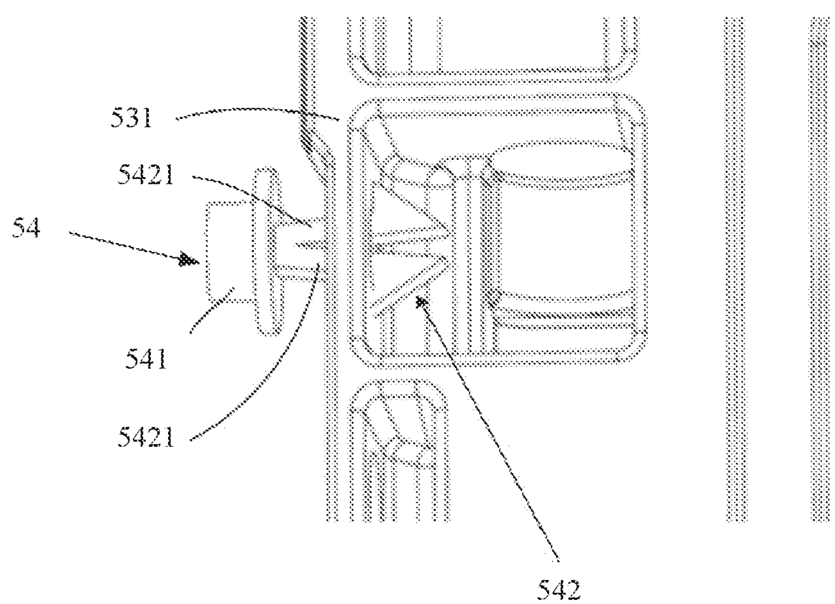
FIG. 11 is a schematic structural diagram of the fixing mechanism on the end plate in the embodiment shown in FIG. 8.

In a possible embodiment, as shown in FIG. 10, the elastic-handle group 542 may include two elastic handles 5421. During the working process, first squeeze the two elastic handles 5421 toward the middle, then the mechanism 54 can pass through the first hole 521 and the second hole 5311 in sequence; when the clamping part of the fixing mechanism 54 extends into the end plate 531, the external force on the two elastic handles 5421 disappears, causing the hooks on the two elastic handles 5421 to move away from each other naturally, so that the liquid-cooled side plate 52 is firmly fixed on the end plate 531.

In other possible embodiments, the elastic-handle group may also include three elastic handles, four elastic handles, etc., which are not limited in this embodiment of the present application and may be set according to actual conditions. Exemplarily, the elastic handle set may include three elastic handles, and the three elastic handles may form a circle, the working process of which is similar to the working principle of the elastic handle set including two elastic handles, so the process will not be elaborated.

Figure 12:
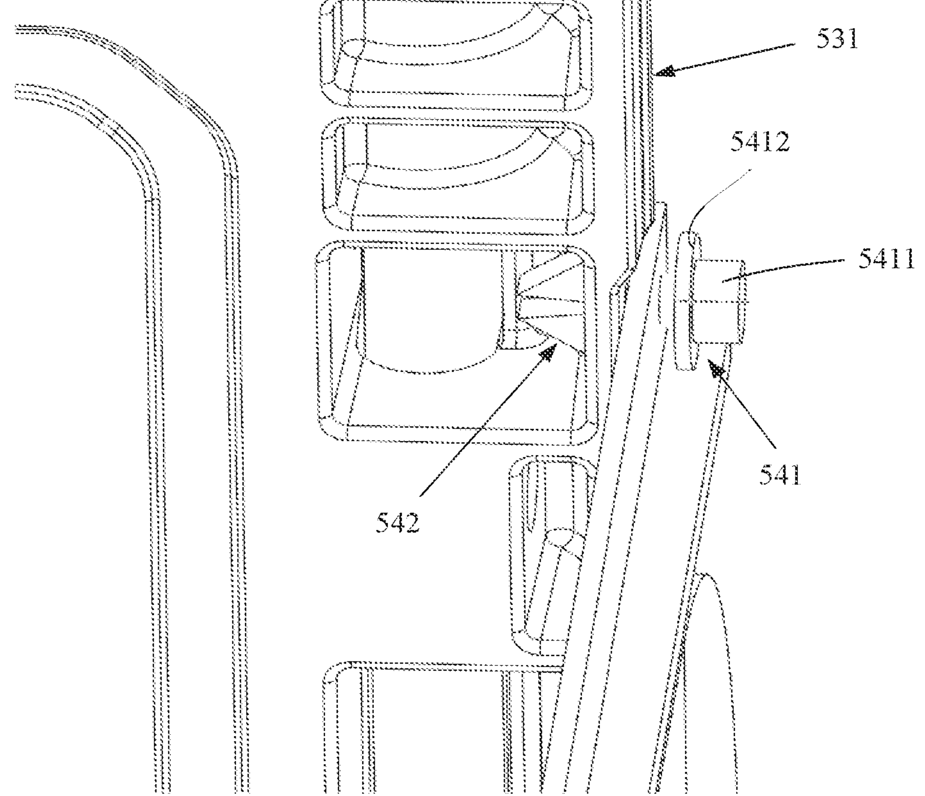
FIG. 12 is a structural schematic diagram from another perspective of the fixing mechanism on the end plate in the embodiment shown in FIG. 8 of the present application.

In some embodiments, as shown in FIG. 12, the cap 541 includes a first flange 5411 and a second flange 5412; the second flange 5412 is connected to one end of the elastic-handle group 542, and the first flange 5411 can be integrated with the second flange 5412.

The liquid-cooled side plate 52 is provided with at least one pair of first holes 521, and the two first holes 521 in the pair of first holes 521 are distributed at intervals along the length direction of the liquid-cooled side plate 52. One of them is a round hole, and the other is a waist-shaped hole extending along the length direction of the liquid-cooled side plate 52. One of them is set as a round hole, and the other is set as a round hole, so that the liquid-cooled side plate 52 can adapt to the deviation in the length direction of different battery modules 3 when it is fixed, that is, the wearable range of the length of the waist-shaped hole in the length direction of the liquid-cooled side plate 52 is larger. It should be noted that the length direction of the liquid-cooled side plate 52 refers to the direction along the stacked batteries in the battery module 53.

Figure 7:
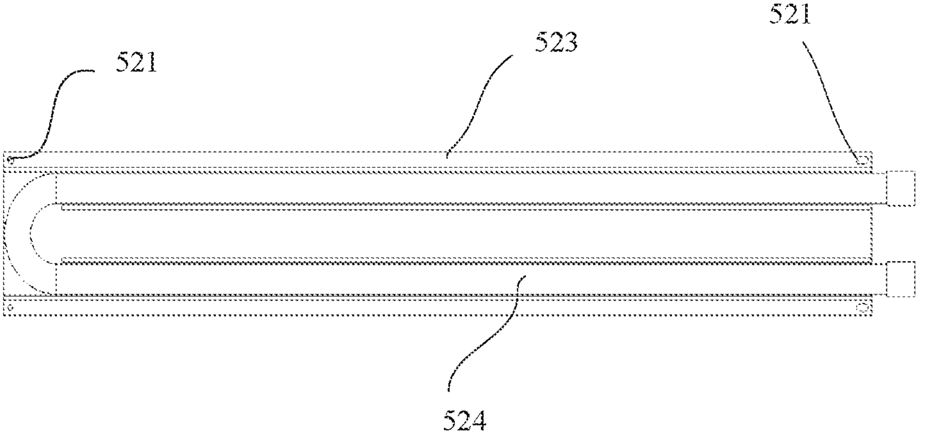
FIG. 7 is the front view of the liquid-cooled side plate in the embodiment shown in FIG. 6.

Referring to FIG. 7, in this embodiment, the liquid-cooled side plate 52 includes a uniform-temperature plate 523 and a liquid-cooled pipe 524, the liquid-cooled pipe 524 is fixed on the uniform-temperature plate 523, the cooling liquid is in the liquid-cooled pipe 524, and the uniform-temperature plate 523 is fixed on the end plate 531 of the battery module 53. The uniform-temperature plate 523 can further increase the cooling area on the side of the battery module 53, and the liquid-cooled pipe 524 is set as a U-shaped pipe to facilitate the circulation of cooling liquid.

Figure 6:
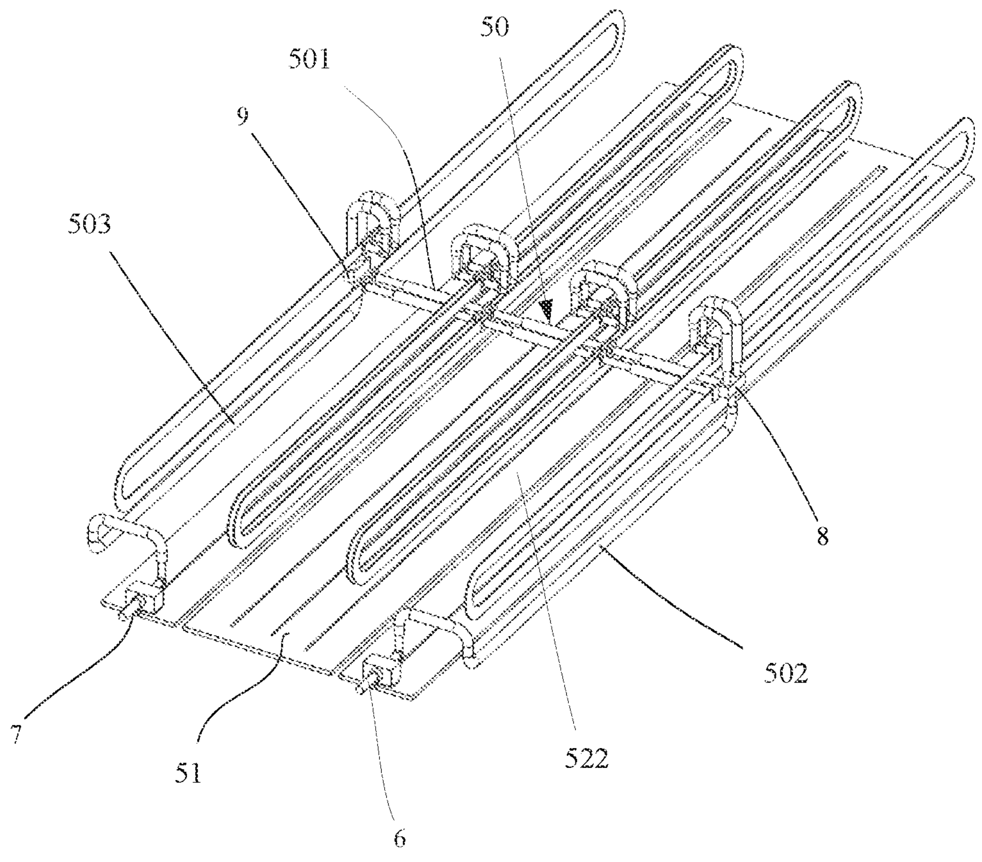
FIG. 6 is a schematic structural diagram of a battery pack liquid-cooled plate provided in another embodiment of the present application.

Referring to FIG. 6, for the cooling liquid in the liquid cooling plate to enter the first cooling channel and the second cooling channel smoothly, the liquid-cooled plate also includes a liquid inlet 6 (equivalent to the liquid distribution box 4 at the position of the liquid inlet 13 in the previous embodiment) and the liquid outlet 7 (equivalent to the liquid distribution box 4 at the position of the liquid outlet 14 in the previous embodiment), the two ends of the first cooling channel are respectively connected to the liquid inlet 6 and the liquid outlet 7, and the second cooling channel is connected in parallel with the first cooling channel. After the cooling liquid enters from the liquid inlet 6, it is divided into two paths: one path flows in from the first cooling channel in the liquid-cooled bottom plate 51, and the other path delivers the cooling liquid to the flow channels (the second cooling channel) of each liquid-cooled side plate 52 through the pipeline 50, and then the cooling liquid passes through the first cooling channel and the second cooling channel respectively and then flows out from the liquid outlet 7.

The positions of the inlets and outlets of the flow channel of the plurality of liquid-cooled side plates 52 are arranged as follows.

Among the plurality of liquid-cooled side plates 52, the flow channel inlet and flow channel outlet of one of the outer liquid-cooled side plates 52 are respectively located on a first plane and a second plane; the flow channel inlet and flow channel outlet of the other liquid-cooled side plate 52 located on the outside are respectively located on the second plane and the first plane; the flow channel inlet and the flow channel outlet of the middle liquid-cooled side plate 52 are located on the second plane, wherein the second plane is located between the first plane and the liquid-cooled bottom plate 51. It should be noted that the definition of the first plane and the second plane is only intended to indicate that the positions of the flow channel inlet, the flow channel outlet and the liquid-cooling bottom plate 51 of the liquid-cooled side plate 52 are at different heights, and the first plane and the second plane are close to the plane where the liquid-cooled bottom plate 51 is located, which is convenient for assembly.

For the pipelines of each liquid-cooled side plate 52 connected in series, the following embodiments can be arranged.

Referring to FIG. 6, the pipeline 50 includes: a first pipeline 501 (which can be understood as the connecting pipeline group 331 in the above-mentioned embodiment) for connecting two adjacent liquid-cooled side plates 52 in the side cooling unit; the liquid-inlet pipe 502 (which can be understood as the liquid-inlet pipe 31 in the above embodiment) connected to the liquid inlet 6, which interconnects with one end of the second cooling channel; the liquid-outlet pipe 503 (which can be understood as the liquid-outlet pipe 32 in the above embodiment) used to interconnect with the liquid outlet 7, which interconnects with the other end of the second cooling channel.

The cooling liquid enters from the liquid inlet 6 and flows through the liquid-inlet pipe 502 to the entrance of the second cooling channel, enters the flow channel of a liquid-cooled side plate 52, and then flows through the first pipeline 501 to the flow channel of the adjacent next liquid-cooled side plate 52. The cooling liquid flows sequentially through the flow channels of all the liquid-cooled side plates 52 in the side cooling unit until it reaches the outlet of the second cooling channel and then flows out from the liquid outlet 7 through the liquid-outlet pipe 503.

In a possible embodiment, the battery modules 53 in the battery pack can also be arranged in multiple rows and multiple columns. In view of the above situation, the side cooling units in the embodiment of the present application include at least two groups, and each group of the side cooling unit is arranged side by side along the length direction of the liquid-cooling bottom plate 51. The liquid-cooling side plates 52 of the adjacent two groups of side cooling units are connected in one-to-one correspondence, and the liquid-cooling side plates 52 connected in the adjacent two groups of side cooling units are connected in parallel with the second cooling channels.

In the embodiment of the present application, the number of side cooling units and the number of liquid-cooled side plates 52 in each side cooling unit are set according to the number and arrangement of battery modules 53. For example, the battery pack includes four battery modules 53, and the four battery modules 53 are arranged in the way of two rows and two columns, then two side cooling units can be arranged, and each side cooling unit includes three liquid-cooled side plates 52, which can reduce the temperature the battery module 3 in the battery pack. This embodiment of the present application is only used as an example and is not limited thereto.

In order to realize the flow channel interconnection between the liquid-cooled side plates 52 and between the liquid-cooled side plates 52 and the liquid inlet 6 and the liquid outlet 7, in a possible embodiment, the pipelines 50 in two adjacent groups of side cooling units include: the first pipeline 501, the liquid-inlet pipe 502, the liquid-outlet pipe 503, the first tee 8 (which can be understood as the inlet liquid diverter 332 in the above embodiment) and the second tee 9 (which can be understood as the outlet liquid diverter 333 of the above-mentioned embodiment).

The first pipeline 501 for connecting the two liquid-cooled side plates 52 in the side cooling unit; the liquid-inlet pipe 502 for connecting the liquid inlet 6; the liquid-outlet pipe 503 for connecting the liquid outlet 7; the first tee 8 connects with the liquid-inlet pipe 502 and one end of the second cooling channels of the adjacent two groups of side cooling units; the second tee 9 connects with the liquid-outlet pipe 503 and the other end of the second cooling channels of the adjacent two groups of side cooling units.

The cooling liquid delivered from the liquid-inlet pipe 502 is divided into two paths through the first tee 8: one way is delivered to the flow channel of the liquid-cooled side plate 52 in one of the side cooling units, and the other way is delivered to the flow channel of the liquid-cooled side plate 52 in the other side cooling unit; the cooling liquid that enters the flow channel of the liquid-cooled side plate 52 also flows into the flow channel of the next adjacent liquid-cooled side plate 52 through the first pipeline 501, and the cooling liquid flows from the flow channels of all the liquid-cooled side plates 52 in the side cooling unit in sequence until reaching the outlet of the second cooling channel, and then flow together to the outlet pipe 503 through the second tee 9 to flow out from the outlet 7. After the first tee 8 and the second tee 9 are arranged, the two side cooling units can share one liquid inlet 6, so as to avoid setting multiple liquid inlets to make the installation too complicated. It should be noted that: the attention should be paid to the installation direction of each liquid-cooled side plate 52 in the two side cooling units during installation; the direction of the liquid-cooled side plate 52 on the front side cooling unit is different from the direction of the liquid-cooled side plate 52 on the back side cooling unit, which is symmetrically arranged.

Figure 8:
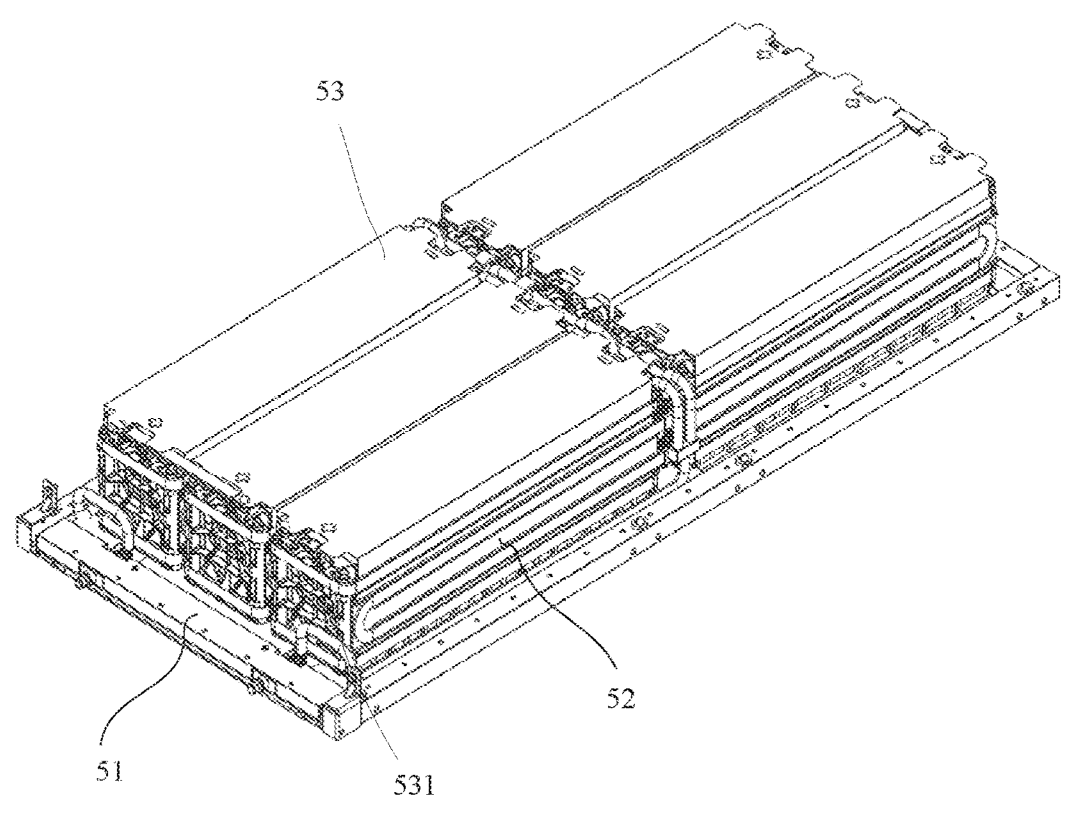
FIG. 8 is a schematic structural diagram of a battery pack assembled from the battery pack liquid-cooled plate in the embodiment shown in FIG. 6

Referring to FIG. 8, the embodiment of the present application also provides a battery pack, which includes: a battery pack liquid-cooled plate for easy fixing; a battery module 53 installed in the installation space 522, and a fixing mechanism 54 is connected to the battery module 53. Compared with the prior art, the battery pack liquid-cooled plate has added a side cooling unit, and the liquid-cooled side plate 52 is fixed on the battery module 53 with a fixing mechanism 54 to cool the bottom and side surfaces of the battery pack, increasing the overall cooling area of the whole battery pack, as well as improving the cooling efficiency of the battery pack.

In the description of the present application, it should be noted that the orientation or positional relationship indicated by the terms "upper", "lower" and so on is based on the orientation or positional relationship shown in the drawings and is only for the convenience of describing the present application and simplifying the description; it is not intended to indicate or imply that the device or element referred to must have a particular orientation. Unless otherwise clearly specified and limited, the terms "installation", "connection" and "connection" should be interpreted in a broad sense, for example, it may be a fixed connection, a detachable connection, or an integral connection; it may be a mechanical connection, it can also be an electrical connection; it can be a direct connection, or an indirect connection through an intermediary, or an internal connection between two components. Those of ordinary skill in the art can understand the specific meanings of the above terms in this application according to specific situations.

It should be noted that in this application, relative terms such as "first" and "second" are only used to distinguish one entity or operation from another entity or operation, no such actual relationship or order between these entities or operations is necessarily required or implied. Furthermore, the term "comprises", "includes" or any other variation thereof is intended to cover a non-exclusive inclusion, so that a process, method, article, or apparatus that includes a set of elements includes not only those elements, but also includes other elements that are not expressly listed, or elements inherent in the process, method, article, or apparatus. Without further limitations, an element defined by the phrase "comprising a . . . " does not preclude the presence of additional identical elements in the process, method, article, or apparatus that includes the element.

The above are only specific implementation manners of the present application, so that those skilled in the art can understand or implement the present application. Various modifications to these embodiments will be readily apparent to those skilled in the art, and the general principles defined herein may be implemented in other embodiments without departing from the spirit or scope of the application. Therefore, the present application will not be limited to the embodiments shown herein but is to be accorded the widest scope consistent with the principles and novel features claimed herein.

The invention claimed is:

1. A battery pack liquid-cooled plate, wherein the battery pack liquid-cooled plate comprises:

a liquid-cooled bottom plate for bottom cooling of a battery, wherein a first cooling channel is provided in the liquid-cooled bottom plate;

multiple liquid-cooled side plates used for side cooling of the battery, wherein a second cooling channel is provided in each liquid-cooled side plate, each liquid-cooled side plate and the liquid-cooled bottom plate are arranged perpendicular to each other, and a flow channel of each liquid-cooled side plate interconnects with each other through a multi-pass device to form a flow-channel structure.

2. The battery pack liquid-cooled plate of claim 1, wherein, the liquid-cooled bottom plate has a liquid outlet and a liquid inlet, and the liquid outlet and the liquid inlet are both equipped with a liquid distribution box, and the liquid distribution box has a bottom plate interface and a side plate interface, and, a flow channel in the liquid-cooled bottom plate interconnects with the bottom plate interface of two liquid distribution boxes to form the first cooling channel;

the flow-channel structure interconnects with the side plate interface of the two liquid distribution boxes to form the second cooling channel.

3. The battery pack liquid-cooled plate of claim 2, wherein, the multi-pass device comprises:

a liquid-inlet pipe, interconnecting with the liquid distribution box located at the liquid inlet;

a liquid-outlet pipe, interconnecting with the liquid distribution box located at the liquid outlet; and a diversion device for supplying liquid to the liquid-cooled side plate, number of the diversion devices is one or more, and two ends of the diversion device are connected to the liquid-inlet pipe and the liquid-outlet pipe, wherein, when there are multiple diversion devices, the diversion devices are arranged in parallel between the liquid-outlet pipe and the liquid-inlet pipe, and each diversion device connects the liquid-cooled side plates in same column or row in series, so that to distribute a cooling liquid to the liquid-cooled side plates in same column or row.

4. The battery pack liquid-cooled plate of claim 3, wherein, each liquid-cooled side plate comprises:

a uniform-temperature plate for averaging temperature, number of the uniform-temperature plate is one or two, and the uniform-temperature plate is installed on the liquid-cooled bottom plate;

a liquid-cooled pipe arranged on a side of the uniform-temperature plate away from the battery.

5. The battery pack liquid-cooled plate of claim 3, wherein, each diversion device comprises a connecting pipeline group, number of the connecting pipeline group is one or two groups, each connecting pipeline group connects multiple liquid-cooled side plates connected to the same side of the diversion device in series, wherein, when number of connecting pipeline group is two, each diversion device further comprises:

an inlet liquid diverter, one end of the inlet liquid diverter connects to the liquid-inlet pipe, and the other end respectively connects to inlets of two groups of the connecting pipeline group;

an outlet liquid diverter, one end of the outlet liquid diverter connects to the liquid-outlet pipe, and the other end is respectively connects to outlets of two groups of the connecting pipeline group.

6. The battery pack liquid-cooled plate of claim 3, wherein, the battery pack liquid-cooled plate comprises:

a supporting center beam, installed between each diversion device and the liquid-cooled bottom plate.

7. The battery pack liquid-cooled plate of claim 2, wherein, the liquid-cooled bottom plate comprises:

a frame, and the liquid inlet and the liquid outlet are provided on the frame;

a liquid-cooled plate, the first cooling channel is arranged in the liquid-cooled plate, and two ends of the first cooling channel are respectively connected to the bottom plate interface of the two liquid distribution boxes.

8. The battery pack liquid-cooled plate of claim 7, wherein, the frame comprises:

a structural side beam for carrying weight close to ends of the liquid-cooled side plates;

an installation side beam used for installation of the battery pack liquid-cooled plate, and the installation side beam is arranged perpendicular to the length direction of the structural side beam.

9. The battery pack liquid-cooled plate of claim 8, wherein, the structural side beam comprises:

a beam body;

a reinforced beam, installed on a side of the beam body and the side is close to the battery.

10. The battery pack liquid-cooled plate of claim 2, wherein, the liquid outlet and the liquid inlet on the liquid-cooled bottom plate is provided a flow channel hole respectively;

the bottom plate interface is connected to the flow channel hole, and a diameter of the bottom plate interface is larger than that of the flow channel hole.

11. The battery pack liquid-cooled plate of claim 1, wherein, an installation space for installing at least one battery is formed between two adjacent liquid-cooled side plates, wherein the installation space is suitable for containing a battery module composed of a plurality of batteries, and the battery pack liquid-cooled plate further comprises a fixing mechanism, the fixing mechanism is arranged on the liquid-cooled side plate, and is used to fix the liquid-cooled side plate on the battery module.

12. The battery pack liquid-cooled plate of claim 11, wherein, the liquid-cooled side plate is provided with a first hole, the fixing mechanism is penetrated through the first hole, and one end of the fixing mechanism has a clamping part for clamping, the clamping part is located in a second hole on an end plate of the battery module.

13. The battery pack liquid-cooled plate of claim 12, wherein, the fixing mechanism comprises a cap and at least an elastic-handle group, wherein, one end of the elastic-handle group connects to the cap, and the other end extends away from each other to form a V-shaped structure;

the end of the elastic-handle group away from the cap is further provided with a hook part, and the elastic-handle group and the hook part on the elastic-handle group form a clamping part together.

14. The battery pack liquid-cooled plate of claim 12, wherein, the liquid-cooled side plate is provided with at least one pair of first holes, and the two first holes in the pair of first holes are distributed at intervals along the length direction of the liquid-cooled side plate; one of the first holes is a round hole, and the other first hole is a waist-shaped hole extending along a length direction of the liquid-cooled side plate.

15. A battery pack, wherein, the battery pack comprises: a battery pack liquid-cooled plate according to claim 1.

16. A battery pack, wherein, the battery pack comprises: a battery pack liquid-cooled plate according to claim 11.

* * * * *